United States Patent
Volkau et al.

(10) Patent No.: US 11,845,228 B2
(45) Date of Patent: Dec. 19, 2023

(54) OBJECT COMPARISON UTILIZING A DIGITAL REPRESENTATION OF A THREE-DIMENSIONAL OBJECT ON A SPHERE OF A PRE-DETERMINED RADIUS

(71) Applicants: Hewlett-Packard Development Company, L.P., Spring, TX (US); Nanyang Technological University, Singapore (SG)

(72) Inventors: Ihar Volkau, Singapore (SG); Yelena Helen Balinsky, Bristol (GB)

(73) Assignees: Hewlett-Packard Development Company, L.P., Spring, TX (US); Nanyang Technological University, Singapore (SG)

( * ) Notice: Subject to any disclaimer, the term of this patent is extended or adjusted under 35 U.S.C. 154(b) by 0 days.

(21) Appl. No.: 17/659,315

(22) Filed: Apr. 14, 2022

(65) Prior Publication Data
US 2023/0330938 A1    Oct. 19, 2023

(51) Int. Cl.
B33Y 50/02 (2015.01)
B29C 64/386 (2017.01)
G06F 30/20 (2020.01)
G06F 113/10 (2020.01)

(52) U.S. Cl.
CPC ............ B29C 64/386 (2017.08); G06F 30/20 (2020.01); *B33Y 50/02* (2014.12); *G06F 2113/10* (2020.01)

(58) Field of Classification Search
CPC .................................................... B33Y 50/02
See application file for complete search history.

(56) References Cited

U.S. PATENT DOCUMENTS

| | | | |
|---|---|---|---|
| 7,343,039 B2 | 3/2008 | Liu et al. | |
| 2009/0157649 A1 | 6/2009 | Papadakis et al. | |
| 2012/0321176 A1* | 12/2012 | Li | G06V 10/7715 382/159 |
| 2014/0058959 A1* | 2/2014 | Isbjornssund | B33Y 50/00 705/310 |
| 2020/0264585 A1* | 8/2020 | Ryan | G06F 21/10 |
| 2020/0269511 A1* | 8/2020 | Vasil | H04L 9/3239 |
| 2021/0295594 A1* | 9/2021 | Sinha | G06V 20/64 |

FOREIGN PATENT DOCUMENTS

WO    WO-2020176737 A1 *    9/2020    ............. B22F 10/20

OTHER PUBLICATIONS

Bentley, J. L., "Multidimensional binary search trees used for associative searching," Communications of the ACM 18, No. 9, 1975, pp. 509-517.

Fliege, J., et al., "A Two-Stage Approach for Computing Cubature Formulae for the Sphere," 139T, Fachbereich Mathematik, Universitat Dortmund, Dortmund, 1996, pp. 1-31.

(Continued)

*Primary Examiner* — Suresh Suryawanshi
(74) *Attorney, Agent, or Firm* — SHOOK, HARDY & BACON L.L.P.

(57) ABSTRACT

According to examples, a method comprises obtaining a digital representation of a three-dimensional object, mapping the digital representation on to a sphere of a pre-determined radius and generating a descriptor of the digital representation based on a spherical harmonic decomposition of an output of the mapping.

15 Claims, 4 Drawing Sheets

(56) References Cited

OTHER PUBLICATIONS

Hardin, R. H., et al., "McLaren's improved snub cube and other new spherical designs in three dimensions," Discrete & Computational Geometry 15, No. 4, 1996, pp. 429-441.

Kazhdan, M., et al., "Rotation invariant spherical harmonic representation of 3D shape descriptors," in Eurographics Symposium on Geometry Processing, 2003, pp. 156-165.

Martinet, A., et al., "Accurate Detection of Symmetries in 3D Shapes," hal.inria.fr, Apr. 27, 2009, 27 pages.

Saupe D., et al., "3D model retrieval with spherical harmonics and moments," citeseerx.ist.psu.edu, Institut fur Informatik, Universitat Leipzig, 2001, pp. 1-6.

Skibbe H., et al., "Fast Computation of 3D Spherical Fourier Harmonic Descriptors—A complete orthonormal basis for a rotational invariant representation of three-dimensional objects," 2009 IEEE 12th International Conference on Computer Vision Workshops, ICCV Workshops, Sep. 27-Oct. 4, 2009, 7 pages.

Saupe, Dietmar, and Dejan V. Vranio. "3D model retrieval with spherical harmonics and moments." Joint Pattern Recognition Symposium. Springer, Berlin, Heidelberg, 2001.

* cited by examiner

OBJECT COMPARISON UTILIZING A DIGITAL REPRESENTATION OF A THREE-DIMENSIONAL OBJECT ON A SPHERE OF A PRE-DETERMINED RADIUS

BACKGROUND

Additive manufacturing enables the construction of three-dimensional objects from digital representations of the objects. In recent years additive manufacturing has advanced to the point that additive manufacturing processes are deployable at an industrial scale.

Additive manufacturing techniques enable the production of controlled objects (COs). COs may be counterfeit or illegal goods or goods which are subject to copyright, licensing or regulations. In recent years concerns have been over the proliferation of additively manufactured weapons and fake parts. In response, measures are being introduced to deter manufacturing of COs.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Additive manufacturing has revolutionized industry and has brought many new opportunities for individuals and businesses. In recent years concerns have been raised among legislators and industry about the proliferation of so-called controlled objects (COs). COs are objects that may be subject to legal protection or regulation such as copyrighted objects or weapons.

The methods and systems described herein are used to identify objects such as COs. The methods are based on confidentiality preserving descriptors (CPDs). A CPD is a lossy, non-reversible representation of an object. CPDs capture some important information about the shape of the object, enabling detection of the presence or absence of key features or properties of the object. However, CPDs do not contain enough information about the geometry of the object to perform complete object restoration.

Feature-based CPDs provide a mechanism for fast and effective rejection of objects as COs. For example, the number of holes in an object may be determined efficiently and compared with the number of holes of a CO. It is relatively straightforward to say with high confidence that the object is not the CO if the number of holes is sufficiently different. This CPD therefore enables a fast rejection of an object as a CO in many cases. However, CPDs with improved accuracy may be desired to positively identify COs.

The methods described herein are based on two computations. Firstly, a method to compute a CPD using a spherical harmonic transformation (SHT), based on Legendre polynomials, for three-dimensional object identification. Secondly a method based on a discriminative band comparison (DBC) computation, which compares extrema of the surface representations of the objects in low-dimensional bands of spherical harmonics. According to examples, the methods described herein determine whether objects match or not within a predefined accuracy based on a parameter which determines a number of bands of the SHT. In addition, the disclosed methods may be used to determine a transformation that maps an object under identification into a CO, when a match is established.

Figure 1:
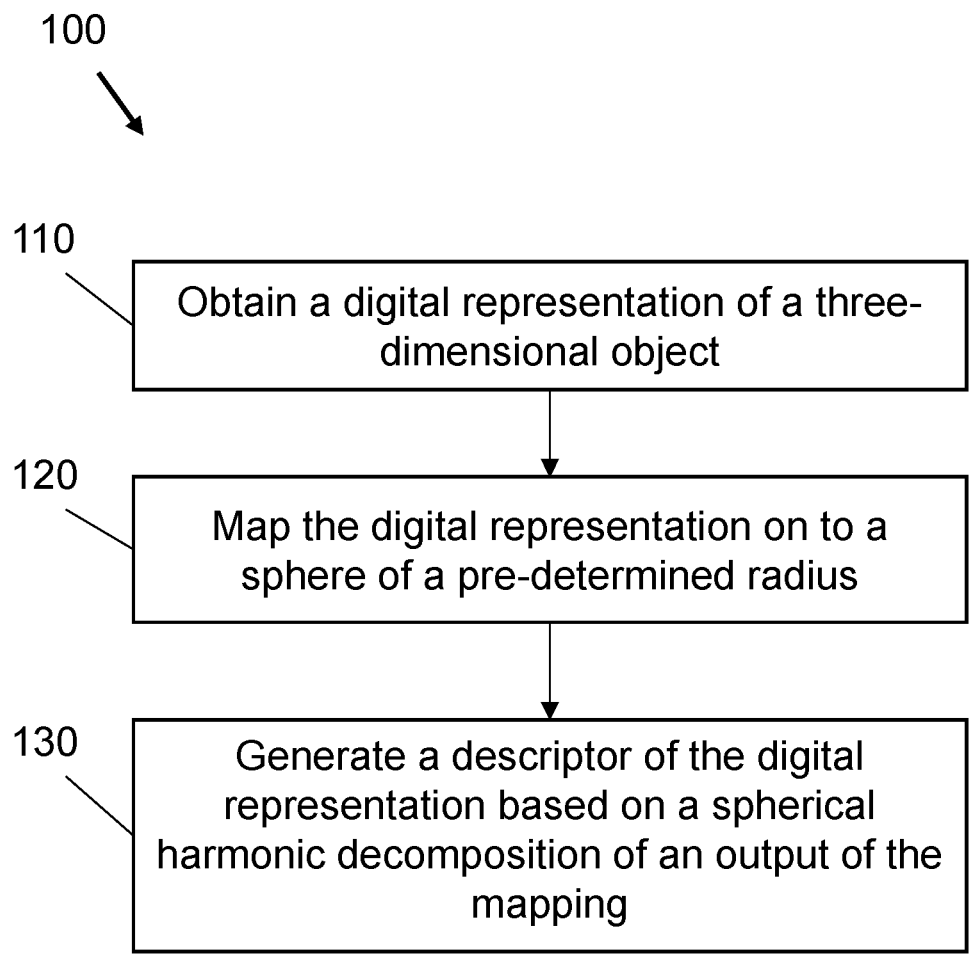
FIG. 1 is a block diagram showing a method for generating descriptors of a three-dimensional object, according to an example.

FIG. 1 is a block diagram showing a method 100 that may be used with the other methods and systems described herein. The method 100 enables computation of a CPD, according to an example.

At block 110 the method 100 comprises obtaining a digital representation of a three-dimensional object. The digital representation comprises data representative of the object such as a CAD representation of the object. The digital representation of the object may be displayed to a user on a graphical user interface. The object may be normalized by moving the center of mass to an origin of a system of coordinates and scaling the object to make a mean distance of points, m, to the origin equal.

At block 120 the method 100 comprises mapping the digital representation on to a sphere of pre-determined radius. According to examples, for a sphere of radius R, mapping the digital representation on to the sphere may comprise superimposing a dense set of points at the surface of a sphere and determining a point-wise function comprising a minimal distance for each point to the surface of the object. The dense set of points may be, for example, a set of Fliege-Maier points on the sphere. These points may be used for low-error integration through direct weighted summation of the point-wise function evaluated at these points. Alternatively, t-designs may be used. A t-design constitutes a uniform arrangement of points on a sphere for which spherical polynomials up to degree t may be integrated exactly by summation of their values at the points defined by the t-design.

At block 130 the method 100 comprises generating a descriptor of the digital representation based on a spherical harmonic decomposition of an output of the mapping. An output of the mapping comprises the minimal distances from the object to the surface of the sphere at the dense net of points. Determining a spherical harmonic decomposition may be performed using the Gauss quadrature formulae. The function is evaluated at the nodes on the sphere, and the function values are then multiplied with certain weights and the results are summed up.

The resulting descriptor of the object comprises the N levels, also referred to herein as energy bands, which are coefficients of the Spherical Harmonic Transform (SHT) of the point-wise function. The Gauss quadrature formulae provide fast and accurate calculations of spherical harmonic coefficients, compared to performing the SHT using least-squares.

The method 100 may be repeated for concentric spheres having radii from a pre-defined set of radii $\{R_i\}$, $0<R_i\leq 2$ m. For each radius $R_i$ from $\{R_i\}$, a descriptor comprising an array of SHT coefficients, denoted $\{SHT(i)\}$ may be determined. As a result of the method 100 a three-dimensional object may be encoded by its CPDs, a low-dimensional representation of its shape by a set of feature vectors. This representation allows efficient storage, search and retrieval of descriptors of controlled objects.

Figure 2:
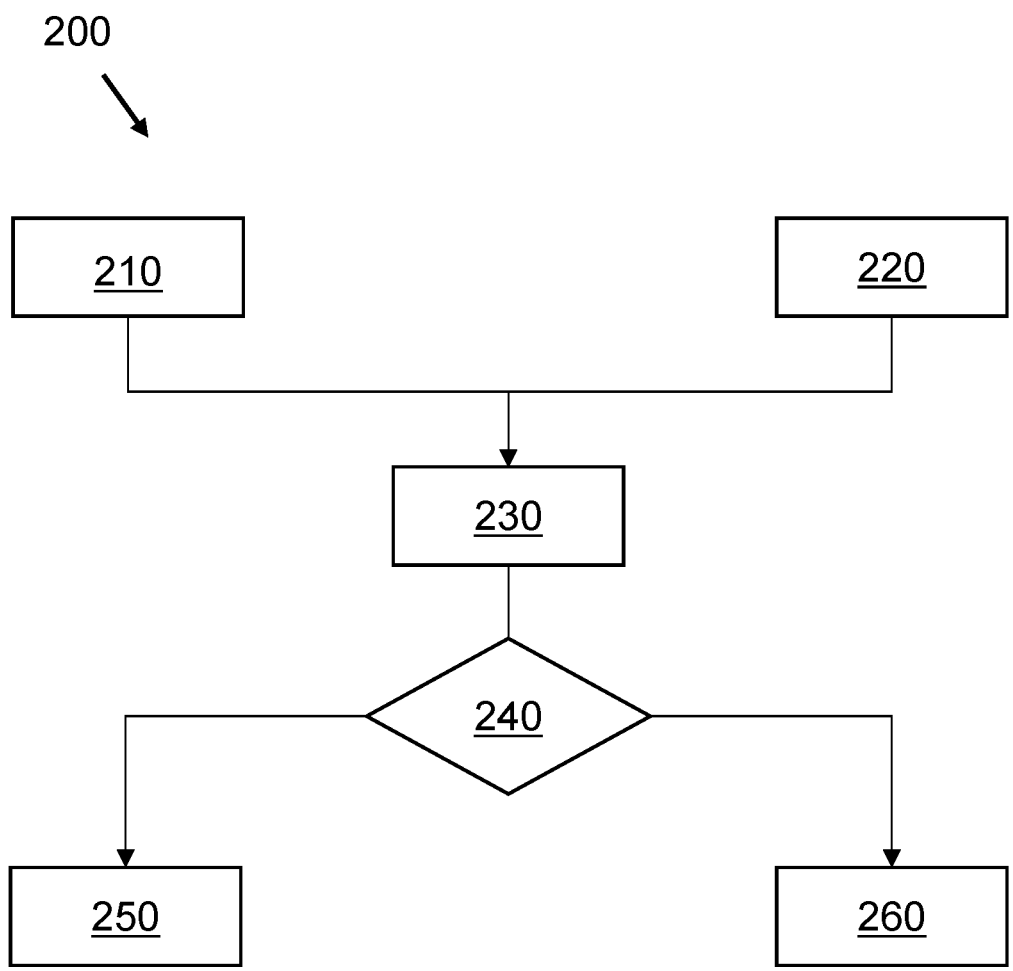
FIG. 2 is a flow diagram showing a method for comparing descriptors of three-dimensional objects, according to an example.

FIG. 2 shows a flow diagram of a method 200 for comparing descriptors of two objects, according to an example. The method 200 may be used in conjunction with the other methods and systems described herein.

At block 210 the method 200 comprises, obtaining descriptors of a first three-dimensional object, S, based on a digital representation. According to examples, obtaining descriptors of the first object, S, may comprise obtaining a digital representation of the first object, S, and generating descriptors using the method 100 shown in FIG. 1. Similarly, at block 220, the method 200 comprises obtaining descriptors of a second three-dimensional object, T. Descriptors of the second three-dimensional object, T, may also be obtained using the method 100 shown in FIG. 1. Thus, after blocks 210 and 220 two sets of descriptors, CPDs(S) and CPDs(T), are generated, where each CPDs={SHT(i)} comprises an array of SHT coefficients for objects S and T.

At block 230, each SHT (i) is split into N+1 bands, $b_0, \ldots, b_N$ where band $b_j$ has (2i+1) coefficients. Herein, the term "order N" refers to the first N+1 bands. The object S is described by the set of energy values {es(i,j)} and the object T by {et(i,j)}, where i is the index of a sphere with radius $R_i$, and j is the index of the band. The band energy is a $L^2$ norm of coefficients of the band.

At block 240 energy bands for the objects are compared. In particular, the value |es(i,j)−et(i,j)| is compared to a threshold value, $\varepsilon_1$. At block 250 if for at least one (i,j) pair the |es(i,j)−et(i,j)| is greater than the threshold value $\varepsilon_1$ then the objects are not identical. At block 260, if all of the |es(i,j)−et(i,j)|<$\varepsilon_1$ then the objects may be identical and a further evaluation of SHT coefficients is used to determine whether the objects are identical.

Figure 3:
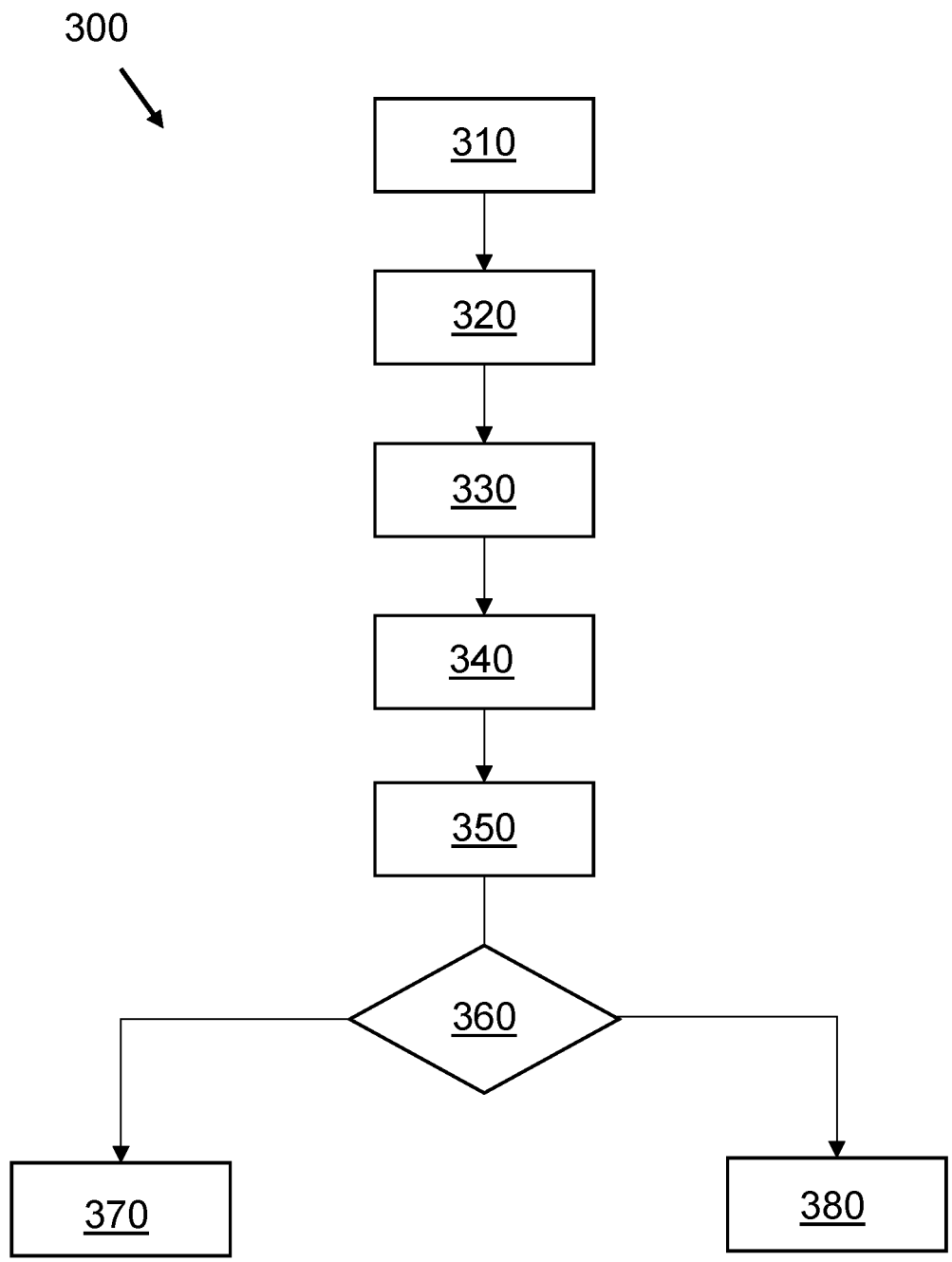
FIG. 3 is a flow diagram showing a method for comparing descriptors of three-dimensional objects, according to an example.

FIG. 3 shows a flow diagram of a method 300 for discriminative band comparison, according to an example. The method 300 may be used in conjunction with the other methods and systems described herein. In particular the method 300 may be used in conjunction with the method 200 shown in FIG. 2, in the case where it is determined that all of the values |es(i,j)−et(i,j)| are less than the threshold value $\varepsilon_1$.

At block 310 the method 300 comprises partial reconstruction of the digital representations of the first and second objects based on an inverse spherical harmonic transformation. For objects S and T, reconstruction of objects $S_j$ and $T_j$ may be performed using coefficients for each band j where $0 \leq j \leq N$.

At block 320, the method comprises selecting a value k where $0 \leq k \leq N$. At block 330 the method comprises determining extrema points for objects $S_k$ and $T_k$ reconstructed using the selected band, k. The extrema points correspond to minima and maxima. At block 340, the method 300 comprises computing a 3×3 rotation matrix that maps the extrema points for objects $S_k$ to objects $T_k$. At block 350, for the matrix M resulting from block 340, a goodness of fit for every concentric sphere and band is evaluated. In an example, the goodness of fit can be used to generate a measures representing a discrepancy between observed values and the values expected, and can be generated using any one of number of tests, such as a Chi-square test and so on. At block 360, the goodness of fit is compared to a second threshold value $\varepsilon_2$. At block 370, if the goodness of fit is within the threshold $\varepsilon_2$ then objects S and T are identical within the required accuracy. Otherwise, at block 380 it is determined that the objects S and T are different.

If the objects S and T are identical within the threshold accuracy, then the matrix M determines rotation angles for mapping S onto T. Combined with scale transformation and translation from the preprocessing step, this transformation fully determines the mapping of the object S to T. This approach is not iterative or computationally expensive.

The methods and systems described herein permit determination of whether a three-dimensional object from an additive manufacturing job matches a known COs with a high degree of accuracy, confidence and speed. The legal requirements and constraints for additive manufacturing are increasingly stringent, introducing legal responsibilities and severe punishments for the manufacturing of prohibited objects. At the same time, there are no methods available which allow object identification prior to commencing a manufacturing job within an additive manufacturing apparatus. The methods described herein may also be deployed in a post-production. This is advantageous when compared to manual object validation, which is substantially less accurate. The internal structure of a physical object may not be visible or not accurately definable under manual inspection.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

Figure 4:
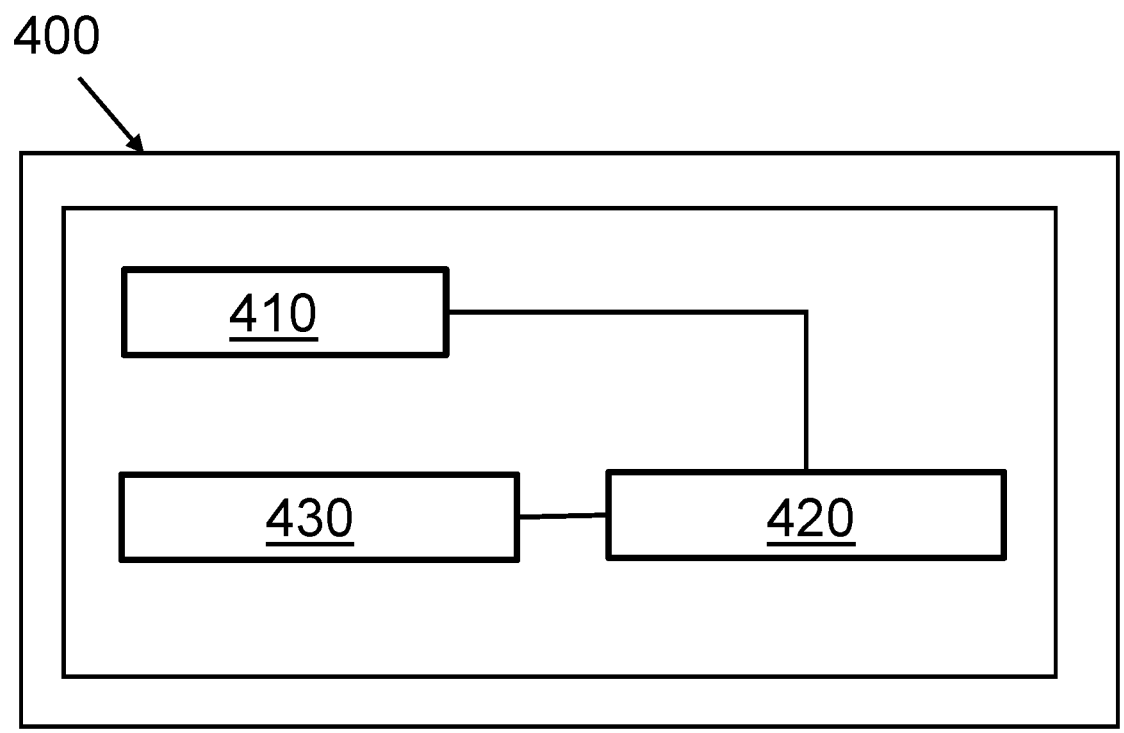
FIG. 4 is a schematic diagram showing a processor and memory, according to an example.

For example, the instructions may be provided on a non-transitory computer readable storage medium encoded with instructions, executable by a processor. FIG. 4 shows an example of a processor 410 associated with a memory 420. The memory 420 comprises computer readable instructions 430 which are executable by the processor 410. The instructions cause the processor to access digital representations of a first three-dimensional object and a second three-dimensional object, determine transformations of the digital representations of the first and second three-dimensional objects on to a sphere of a pre-determined radius at a pre-selected set of points on the sphere and determine descriptors of the digital representations based on a spherical harmonic decomposition of outputs of the transformations. In an example, FIG. 4 can comprise part of an additive manufacturing apparatus 400.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method, comprising:
via a processor:
obtaining a digital representation of a first object that is a three-dimensional object;
mapping the digital representation on to a sphere of a pre-determined radius;
generating a descriptor of the digital representation based on a spherical harmonic decomposition of an output of the mapping;
comparing the descriptor of the first object with a descriptor of a second three-dimensional object; and
determining whether the first and second objects are the same object based on the comparison.

2. The method of claim 1, wherein the spherical harmonic decomposition is based on a parameter that determines a number of components of the decomposition.

3. The method of claim 1, wherein mapping the digital representation on to a sphere comprises:
selecting a set of points on the sphere; and
determining a distance from each point of the set of points to the three-dimensional object.

4. The method of claim 3, wherein the set of points is selected such that the spherical harmonic decomposition is determined from a direct summation.

5. The method of claim 4, wherein the set of points comprises a Fliege-Maier set of a t-design.

6. The method of claim 1, wherein comparing the descriptors of the first and second three-dimensional objects comprises:
determining a vector of data values, each data value comprising a magnitude of a difference between an energy of a component of the spherical harmonic decomposition of the first and the corresponding energy of a component of the spherical harmonic decomposition of the second object; and
comparing each data value of the vector of data values to a first threshold value.

7. The method of claim 6, wherein determining whether the first and second objects are the same object based on the comparison, comprises determining that the first and second object are not the same object when at least one data value is above the first threshold value.

8. The method of claim 6, further comprising:
determining that all of the data values are below the first threshold value;
applying an inverse spherical harmonic transformation to the spherical harmonic decomposition corresponding to each of the first and second objects;
determining minima and maxima of an output of the inverse spherical harmonic transformation for each of the first and second objects;
mapping the minima and maxima associated to the first object on to minima and maxima associated to the second object; and
evaluating an output of the mapping to determine whether the first object is the same as the second object.

9. The method of claim 8, wherein evaluating an output of the mapping comprises comparing the accuracy of the mapping to a second threshold value.

10. A non-transitory computer readable medium encoded with instructions which when executed by a processor, cause the processor to:
access digital representations of a first three-dimensional object and a second three-dimensional object;
determine transformations of the digital representations of the first and second three-dimensional objects on to a sphere of a pre-determined radius at a pre-selected set of points on the sphere;
determine descriptors of the digital representations based on a spherical harmonic decomposition of outputs of the transformations;
compare the descriptors of the first object and the second object; and
determine whether the first and second objects are the same object based on the comparison.

11. The non-transitory computer readable medium of claim 10, wherein the set of points is selected such that the spherical harmonic decomposition is determined from a direct summation.

12. The non-transitory computer readable medium of claim 10, wherein the instructions cause the processor to:
determine an inverse spherical harmonic transformation to the spherical harmonic decomposition corresponding to each of the first and second objects;
determining minima and maxima of an output of the inverse spherical harmonic transformation for each of the first and second objects;
determine a mapping of the minima and maxima associated to the first object on to minima and maxima associated to the second object; and
evaluate an output of the mapping to determine whether the first object is the same as the second object.

13. The non-transitory computer readable medium of claim 10, wherein the instructions cause the processor to:
select a parameter for the spherical harmonic decomposition that determines a number of components of the decomposition.

14. An additive manufacturing apparatus, comprising:
a processor;
a memory coupled to the processor, the memory configured to store program code executable by the processor, the program code comprising one or more instructions, whereby to cause the additive manufacturing apparatus to:
  access digital representations of a first three-dimensional object and a second three-dimensional object;
  determine transformations of the digital representations of the first and second three-dimensional objects on to a sphere of a pre-determined radius at a pre-selected set of points on the sphere;
  determine descriptors of the digital representations based on a spherical harmonic decomposition of outputs of the transformations;
  compare the descriptors of the first object and the second object; and
  determine whether the first and second objects are the same object based on the comparison.

15. The additive manufacturing apparatus as claimed in claim 14, the program code further comprising one or more instructions, whereby to cause the additive manufacturing apparatus to:
  additively manufacture the first object on the basis of an outcome of the determination as to whether the first and second objects are the same object based on the comparison.

\* \* \* \* \*